United States Patent Office 3,846,139
Patented Nov. 5, 1974

3,846,139
TARNISH PREVENTIVE AGENT
Paul F. Warner, Borger, Tex., assignor to Phillips Petroleum Company
No Drawing. Continuation-in-part of application Ser. No. 156,121, June 23, 1971, which is a continuation-in-part of application Ser. No. 723,287, Apr. 22, 1968, which in turn is a continuation-in-part of application Ser. No. 662,280, Aug. 22, 1967, all now abandoned. This application Nov. 22, 1971, Ser. No. 201,118
Int. Cl. C08h; C09d; C09g
U.S. Cl. 106—3
21 Claims

ABSTRACT OF THE DISCLOSURE

An anti-tarnish composition suitable for silver, copper and other tarnishable metals comprises a compound of the formula

HS—R—S—R', HS—R—O—R', HS—R"—S—R"—SH or

HS—R"—O—R"—SH wherein R is an alkaylene group having 1 to 10 carbon atoms, R' is a hydrocarbyl group having 5 to 50 carbon atoms, and R" is an alkylene group having 2 to 12 carbon atoms.

BACKGROUND OF THE INVENTION

This application is a continuation-in-part application of my copending application Ser. No. 156,121, filed June 23, 1971, now abandoned, which is a continuation-in-part of copending application, Ser. No. 723,287, filed Apr. 22, 1968, now abandoned, in turn a continuation-in-part application of then copending application Ser. No. 662,280, filed Aug. 22, 1967, now abandoned.

This invention relates to an anti-tarnish composition for metals. In one aspect, it relates to an anti-tarnish composition incorporating a compound selected from HS—R—S—R', HS—R—O—R', HS—R"—S—R"—SH
and HS—R"—O—R"—SH, wherein R is an alkylene group having 1 to 10 carbon atoms, R' is selected from saturated aliphatic and saturated and unsaturated cycloaliphatic, presently preferably saturated or substantially saturated, including polycyclic cycloaliphatic compounds, and alkaryl groups having from 5 to 50 carbon atoms, and R" is an alkylene group having 2 to 12 carbon atoms. In another aspect, it relates to a metal polish composition including a mild abrasive agent for removal of tarnish, and an anti-tarnish compound of the above formulas.

Tarnishable metals such as silver and copper are well known to tarnish rapidly in normal atmospheres. A housewife who owns silverware, a silver service, or copper utensils finds it necessary to polish these utensile frequently in order to maintain their attractive appearance.

A number of anti-tarnish agents have been suggested to prevent the tarnish of silver or copper. In general, these compounds attach to the metal, forming a thin invisible film which prevents the attack of sulfur or oxygen on the metal. One such anti-tarnish agent which has been proposed is a mercaptan having the general formula RSH where R is a $C_{12}$ to $C_{20}$ straight chain alkyl radical. It is theorized that such a molecule attaches to the metal through the sulfur atom, leaving the straight chain alkyl radical as a protective film on the surface. It is theorized that the alkyl chains upstanding from the surface are packed together so tightly by secondary valence forces that it is impossible for oxygen or sulfur compounds to penetrate the film and cause tarnishing of the metal.

While the anti-tarnish agents of the prior art can be used alone, it is generally preferred for household use to incorporate such agents into a paste or liquid composition. Such a polishing compound will remove old tarnish through incorporation of a light abrasive agent, and will simultaneously treat the clean surface with the anti-tarnish agent to prevent future tarnish.

It is an object of this invention to provide an improved anti-tarnish agent and polish composition containing the same.

Other objects, aspects, and the several advantages of my invention will be apparent to those skilled in the art from my description and appended claims.

SUMMARY OF THE INVENTION

According to this invention, tarnishable metals are protected by treatment with compounds of the formula HS—R—S—R', HS—R—O—R', HS—R"—S—R"—SH, or HS—R"—O—R"—SH, wherein R is an alkylene group having 1 to 10 carbon atoms, R' is a hydrocarbyl group such as alkyl, cycloalkyl and alkaryl having 5 to 50 carbon atoms, and R" is an alkylene group having 2 to 12 carbon atoms. Antitarnish agents of these formulas are superior to the prior art agents which contain a mercapto group, but do not contain a sulfide as well, or do not contain multiple mercapto groups.

Presently preferred are those compounds of the above formulae wherein each R in the case of the thioethers contains 2 to 8 carbon atoms; or in the case of the ethers, 2 to 5 carbon atoms; each R' group in the case of the thioethers contains 5 to 35 carbon atoms, more preferably 5 to 25 carbon atoms; and each R' group in the case of the ethers contains 8 to 20 carbon atoms. Also, it has been found that the compounds most effective do not contain more than 60 carbon atoms when summing R and R'. However, compounds contemplated in parent application Ser. No. 723,287, filed Apr. 22, 1968, can have up to and including 35 carbon atoms. Compounds containing no more than 25 carbon atoms when summing R and R' can be readily recovered by distillation. However, compounds contemplated above can have up to and including 60 carbon atoms, but may be somewhat more difficult to purify than compounds containing no more than 25 carbon atoms.

Each R is an alkylene group; each R' is selected from saturated aliphatic, preferably alkyl groups, saturated and unsaturated cycloaliphatic, presently preferably saturated, including polycyclic groups, and alkaryl groups; each R" is an alkylene group; such that each R and R" can be selected similarly as described for R' except having the requisite two valences.

Other aspects, objects, and the several advantages of this invention will be apparent to those skilled in the art from a reading of this disclosure and the appended claims.

Description of Preferred Embodiments

Compounds exemplary of those within the scope of this invention are:

mercaptomethyl-*n*-eicosyl sulfide
5-mercaptoamyl-*n*-dodecyl sulfide
2-mercaptoethyl-*n*-octadecyl sulfide
bis-(1-mercaptohexyl)sulfide
bis-(1-mercaptododecyl)sulfide
*tert*-dodecyl 2-mercaptoethyl sulfide
*tert*-dodecyl 8-mercaptooctyl sulfide
dicyclopentadienyl 2-mercaptoethyl sulfide
dicyclopentadienyl 8-mercaptooctyl sulfide
cyclohexyl 8-mercaptooctyl sulfide
pinanyl 2-mercaptoethyl sulfide
pinanyl 8-mercaptooctyl sulfide
*tert*-nonyl 8-mercaptooctyl sulfide bis-(1-mercaptooctyl)sulfide
2-mercaptoethyl-*n*-tricontanyl sulfide
2-mercaptoethyl-*n*-tetracontanyl sulfide
2-mercaptoethyl-*n*-pentacontanyl sulfide
2-mercaptoethyl naphthyl sulfide
2-mercaptoethyl *n*-docosyl sulfide
2-mercaptoethyl *n*-pentacosyl sulfide
2-mercaptoethyl *n*-octacosyl sulfide
3-mercaptopropyl *n*-tricontyl sulfide
10-mercaptodecyl *n*-docosyl sulfide
bis-(2-mercaptoethyl) ether
bis-(4-mercaptobutyl) ether
bis-(6-mercaptohexyl) ether
bis-(12-mercaptododecyl)ether
2-mercaptoethyl n-decyl ether
3-mercaptopropyl n-dodecyl ether
4-mercaptobutyl n-tetradecyl ether
5-mercaptoamyl n-hexadecyl ether
2-mercaptoethyl n-octadecyl ether
3-mercaptopropyl n-eicosyl ether
2-mercaptoethyl n-hexadecyl ether
bis-(2-mercaptoethyl) ether
bis-(3-mercaptopropyl) ether
bis-(10-mercaptodecyl) ether
bis-(8-mercaptododecyl) ether
3-mercaptobutyl 4-mercaptoheptyl ether
2-mercaptoethyl 4-ethylphenyl ether
3-mercaptopropyl cyclododecyl ether.

For any ether above may be substituted the equivalent thioether, or for any sulfide above could be substituted the equivalent ether, thus without needlessly lengthening the list of exemplary species.

The currently most preferred compounds falling within the HS—R—S—R' group above are 2-mercaptoethyl-*n*-octadecyl sulfide and *tert*-dodecyl 8-mercaptooctyl sulfide, and of the compounds wherein R' is of higher order, particularly the 2-mercaptoethyl-*n*-eicosyl, and 2-mercaptoethyl-*n*-C$_{22}$-C$_{28}$ sulfides; of the bis-ether types, bis (mercaptoethyl ether); and of the HS—R—O—R' group, 2-mercaptoethyl *n*-octadecyl ether.

Compounds within the generic formulas having short chains are of higher volatility, and therefore somewhat difficult to handle in formulations. On the other hand, the longer chain compounds are more difficult to mix because they are waxy or solid materials. In the foregoing formula, R+R' is preferably not greater than 60, more preferably 25, carbon atoms. Compounds in which R+R' is 25 or less can be recovered by distillation. The compounds 2-mercaptoethyl-*n*-octadecyl sulfide, *tert*-dodecyl 8-mercaptooctyl sulfide, 2-mercaptoethyl-*n*-eicosyl, 2-mercaptoethyl-*n*-C$_{22}$-C$_{28}$ sulfides, and 2-mercaptoethyl n-octadecyl ether, appear to have the best balance of properties of any compounds within the genus, and, therefore, are the currently preferred materials.

In the generic formulas HS—R"—S—R"—SH and HS—R"—O—R"—SH, members with lower molecular weights presently appear to be better cleaners, and members of higher molecular weights presently appear to exhibit improved inhibiting properties. For example, as to the bis-ethers, R" is presently preferred to be ≥6, and for the bis-thioethers, R" is presently preferred to be ≥6, for inhibiting properties.

Although the generic formulas given above encompass branched chain alkyl and alkenyl groups, it is currently preferred that straight chain compounds be used. It is to be noted that, of course, any of the groups R, R', and R" can have other substituents than hydrogen, so long as the substituent is inert and not interferring, such as a halogen.

Compounds of the invention find utility in many areas where mercaptans are usable. Particularly where the normal odor associated with mercaptans heretofore has been objectionable, and because of the very low odor of many of the compounds of this invention, particularly the bis-ethers and ethers, more particularly the ethers, such can be used in conjunction with paint, sealing compounds, silver and copper polish compositions, and so forth. The compounds in general find particular utility in making of metal polish, particularly silver and copper polish, compositions.

While the compounds may be directly applied to previously cleaned metal, in the preferred embodiment, the anti-tarnish agent will be compounded into a polishing composition. Such a composition will include a finely divided abrasive polishing agent such as chalk, silica or alumina. Either natural or synthetic abrasive materials may be employed. Such abrasive powders are known in the prior art, as is illustrated in U.S. Pat. 2,205,115.

A satisfactory polishing composition will also include a diluent. The amount of diluent will depend upon the consistency of the polishing compound desired. In general, a polar solvent can be used as the diluent, with water or a lower alcohol being preferred.

The anti-tarnish agents of the invention have a somewhat unpleasant odor, and it is therefore desirable to add a perfuming agent to polish compositions which are intended for home use. Such agents are readily commercially available.

In order to prevent the abrasive powder from settling out of suspension, a small quantity of a suspending agent should be employed. Such agents are well known to those skilled in the art.

For example, a silver polish composition may be compounded with the following general ranges: 1 to 50 percent of a mercapto compound of the invention such as 2-mercaptoethyl-*n*-octadecyl sulfide, or *tert*-dodecyl 8-mercaptooctyl sulfide, 5 to 98 percent abrasive, 0 to 5 percent odorizer, and 0 to 1 percent suspending agent. Sufficient diluent is then added to form a composition of the desired consistency. Similar compositions can be made using the dimercapto sulfides exemplified by bis-(1-mercaptooctyl)sulfide, or the bis compounds such as bis-(mercaptoethyl) ether; or the ethers such as 2-mercaptoethyl-*n*-octadecyl ether.

Compounds of the formula HS—R—S—R' suitable for use in the invention can conveniently be formed by the reaction of a dithiol having the formula HS—R—SH, wherein R is as defined above, with a monoolefin having 5 to 50 carbon atoms. The olefins useful include the monoolefins and include not only the monoolefinic straight and branched chain hydrocarbons, but cycloaliphatic and aromatic compounds having olefinic side chains as well. Moreover, unsaturated cycloaliphatic compounds, including both monocyclic and polycyclic, can also be employed. The straight and branched chain aliphatic hydrocarbons are preferred. Such reaction can be conducted by various means known in the prior art. Generally, a catalyst is employed. I prefer to use azobisisobutyronitrile as a catalyst, and conduct the reaction at a temperature between 150° F. and 300° F. Any other suitable method of preparation of the compounds could be employed as well, such as the reaction of an olefin sulfide with an aliphatic mercaptan as is described in U.S. Pat. 2,490,984.

The above reaction is conveniently conducted in the presence of a boron trifluoride-phosphoric acid catalyst. The catalyst composition is prepared by treating orthophosphoric acid of variable water content with anhydrous boron fluoride until complete saturation has been realized. With 100 percent phosphoric acid substantially one mole of boron fluoride is absorbed per mole of acid, while in case of aqueous solutions both the phosphoric acid and the water absorb boron fluoride approximately mole for mole. No theories are advanced as to the chemistry involved in the preparation of the catalyst, but it is presumed that a type of chemical combination often referred to as a complex or addition compound or compounds has resulted. Where 100 percent phosphoric acid is concerned, the empirical representation of its complex with boron fluoride is $H_3PO_4 \cdot BF_3$. In the same manner, catalysts prepared from aqueous phosphoric acid and boron fluoride might be considered to be a mixture of the compounds $H_3PO_4 \cdot BF_3$ and $H_3O \cdot BF_3$.

The phosphoric acid employed in preparing the preferred catalyst may be in concentrated form, ranging from the 85 percent acid of commercial grade up to about 100 percent $H_3PO_4$; or aqueous solutions containing as little as 20 to 40 percent $H_3PO_4$ may be employed. For most applications the moderately concentrated to concentrated acid is ordinarily preferred. The readily available 85 percent commercial acid yields a very satisfactory catalyst when saturated with boron fluoride. While orthophosphoric acid is preferred in preparing the catalysts of this invention, other oxygen-containing acids of phosphorus, such as for example phosphorus acid ($H_3PO_3$) in aqueous solution, may also be used, although less active catalysts usually result.

One of the presently preferred compounds of the invention, tert-dodecyl 8-mercaptooctyl sulfide, can be produced by reacting propylene tetramer with 1,8-octanedithiol using $BF_3$—$H_3PO_4$ as the catalyst. The reaction conveniently takes place at room temperature. The two reactants are charged to a reactor at a mole ratio of from about 0.4 to 1 to 1 to 3, and catalyst is added in incremental portions until reaction ceases.

Compounds of the formula HS—R—O—R' can be formed, for example, by the ultraviolet light-induced addition-reaction of hydrogen sulfide to alkenyl ethers of the general formula R'''—O—R' wherein R''' and R' are as defined previously hereinabove.

A presently preferred compound, 2-mercaptoethyl n-octadecyl ether, can be produced by reacting octadecyl vinyl ether with $H_2S$ in the presence of ultraviolet light. The reaction conveniently takes place at room temperature. The reactants can be charged to a reactor in a $H_2S$ to ether mole ratio of from about 30 to 1 to 1 to 1, preferably 15 to 1 to 10 to 1, and then subjected to ultraviolet light. If desired, a nonreactive diluent such as benzene can be employed. Similar conditions are useful for preparing the HS—R''—O—R''—SH compounds.

Other alkenyl ethers that can be reacted to form mercaptoalkyl ethers of the invention include n-decyl vinyl ether, n-dodecyl allyl ether, n-tetradecyl 3-butenyl ether, n-hexadecyl-4-pentenyl ether, n-eicosyl allyl ether and n-hexadecyl vinyl ether.

Compounds of the formula HS—R''—S—R''—SH can be formed, for example, by the ultraviolet irradiation of hydrogen sulfide and a diene having 4 to 12 carbon atoms such as butadiene, piperylene, octadiene, dodecadiene, yielding a mixture of dimercaptan and bis-(1-mercaptoalkyl)sulfide; or by the reaction of a bis-unsaturated thioether R'''—S—R''', wherein R''' is as described below, such as divinylthioether, diallylthioether, di-9-decenylthioether, and the like, and hydrogen sulfide. These mixtures can be separated by any of the methods known in the art. Reaction conditions are similar as described above for the HS—R—O—R'' compounds.

Compounds of the formula HS—R''—O—R''—SH can be formed, for example, by the ultraviolet light induced addition reaction of hydrogen sulfide to ethers of the general formula R'''—O—R''' wherein each R''' is an alkenyl radical of from 2 to 12 carbon atoms per radical such as divinyl ether, diallyl ether, di-9-decenyl ether, di-8-dodecenyl ether, 2-butenyl 3-heptenyl ether, and the like. Presently preferred R''—O—R''' ethers are those corresponding to the general formula $[H_2C=CH(CH_2)_m]_2O$ wherein m=0 to 10. Preparation conditions for the HS—R''—O—R''—SH compounds are similar to those as described for the HS—R—O—R'' compounds.

Example I

The anti-tarnish agent 2-mercaptoethyl-n-octadecyl sulfide was prepared by the addition of 1,2-ethanedithiol to octadecene-1. The octadecene-1 and 1,2-ethanedithiol were added to a reactor, heated to 150° F., and 1.5 grams of azobisisobutyronitrile was added. The exotherm carried the temperature to 280° F. in about 10 minutes, and the reaction was essentially complete in 45 minutes as evidenced by analysis of the mercaptan sulfur. The temperature was maintained at 160° F. to 200° F. for an additional 6 hours, and another 1.5 g. of AIBN was added; no further reaction was observed. The crude product was flash distilled in a rotary evaporator at 270° F. and 0.5 to 1.0 mm. Hg for 1 hour. The kettle product from the flesh distillation was then charged to a Brush still, and all products boiling below 400° F. at 3 microns absolute pressure were taken overhead.

The yield of 2-mercaptoethyl-n-octadecyl sulfide was 60.5 mole percent or 0.83 pound of product per pound of octadecene charged. The purity of the product was 95.8 weight percent by chromatograph.

Example II

For purposes of comparison, clean silver specimens were treated with 2-mercaptoethyl-n-octadecyl sulfide and with n-octadecyl mercaptan. These specimens, along with an untreated specimen were exposed for 50 days in a laboratory having air of high sulfur content. It is estimated that this laboratory exposure would be equivalent to at least a one-year exposure to normal atmosphere. At the end of the test period, the untreated sample was heavily tarnished, the tarnish having brown and deep blue coloration. The sample treated with n-octadecyl mercaptan had a light tan coloration, and had completely lost its silvery luster. The specimen treated with 2-mercaptoethyl-n-octadecyl sulfide showed very light traces of tan in some areas, but remained quite lustrous.

Example III

The anti-tarnish agent bis-(1-mercaptooctyl)sulfide was prepared by the ultraviolet induced addition of hydrogen sulfide to 1,7-octadiene. The two reactants were charged to a 6400 ml. thermal siphon reactor equipped with a 1200 watt ultraviolet lamp. The mixture was irradiated until there was little or no further increase in the mercaptan sulfur content. The product bis-(1-mercaptooctyl)-sulfide was separated from 1,8-octanedithiol and the 1,7-octadiene by vacuum distillation. The yield of bis-(1-mercaptooctyl)sulfide was 21.6 mole percent. The recovered compound had a thiol functionality of 1.95.

Example IV

Clean silver specimens were treated with bis-(1-mercaptooctyl)sulfide and with n-octadecyl mercaptan. These specimens, along with an untreated specimen, were exposed for 7 days in a laboratory having air of high sulfur content. At the end of the test period, the untreated specimen was heavily tarnished, while the specimen treated with bis-(1-mercaptooctyl)sulfide remained quite lustrous.

Example V

One of the compounds of the invention, tert-dodecyl 8-mercapto-octyl sulfide, has been synthesized for evaluation as a tarnish inhibitor for silver and copper. The product is a water-white liquid and has a purity of 99+weight percent.

The compound tert-dodecyl 8-mercaptooctyl sulfide was prepared by reacting 1,8-octanedithiol with propylene tetramer using $BF_3$—$H_3PO_4$ as the catalyst as shown by the following equation:

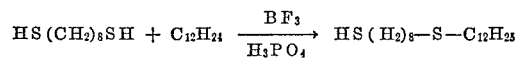

1,8-octanedithiol   propylene tetramer   tert-dodecyl 8-mercapto-
                                         octyl sulfide The reaction was carried out in a 1-liter reaction flask equipped with a motor driven stirrer, reflux condenser, and thermowell. The dithiol and propylene tetramer were placed in the flask; the catalyst was added slowly in small increments so that the reaction temperature could be controlled. Usually, the temperature jumped 5 to 15 degrees with each addition of 4–5 ml. of catalyst until the reaction was complete, then there was further increase in temperature with subsequent additions of catalyst. The reaction was essentially complete in two hours as was indicated by mercaptan sulfur analyses of samples withdrawn from the flask.

At the end of the reaction period, 125 ml. of warm water was added and stirred into the mixture for several minutes. A "tight" emulsion formed which showed little inclniiation to break; 200 ml. or more water was added, the mixture was heated to 180° F.–200° F., and sodium chloride was added to increase the density of the water phase. The phase separated satisfactorily under these conditions. The organic phase was filtered over Drierite to remove entrained water. About 30 grams of crude product was lost in the washing and drying steps.

The crude product was charged to a Brush still and taken overhead at 300° F.–385° F. kettle temperature and 3–5 microns Hg absolute pressure. All cuts having a mercaptan sulfur content between 9.0 and 10.0 were composited as product.

Table I shows data on run conditions, material balance, and properties of the product. Although the material balance data show the yield of product based on dithiol consumed was only 44.5 mole percent, considerable product was discarded in both the light and heavy cuts because the crude charge was too small to obtain efficient recovery of product. It is estimated that the yield would have been at least 20 percent higher had a larger batch of product been made in the synthesis run.

TABLE 1

Material balance and property data on synthesis of tert-dodecyl 8-mercaptooctyl sulfide A. Conditions:
Synthesis temperature, °F................ 80–110
Mole ratio dithio/olefin.................. 1.5
Catalyst................................. BF–H$_3$PO$_4$
Reaction time,[1] hrs..................... 5

|  | Ml. | G. | Moles | Mole per cent |
|---|---|---|---|---|
| B. Charge: |  |  |  |  |
| 1,8-octanedithiol | 267 | 1.5 | 100 |  |
| Tetramer | 168 | 1.0 |  |  |
| BF$_3$—H$_3$PO$_4$ | 35 |  |  |  |
| C. Crude product after washing | 450 | 407 |  |  |
| D. Products recovered by distillation: |  |  |  |  |
| Tetramer | 28 | 23 | 0.14 |  |
| 1,8-octanedithiol | 110 | 107 | 0.60 | 40.0 |
| Intermediates | 40 | [2]38 | 0.11 | 7.4 |
| Product composite | 150 | 138 | 0.40 | 26.7 |
| Heavies[3] | 113 | 102 | 0.20 | 13.3 |
| Dithiol unaccounted for |  |  | 0.19 | 12.6 |
| Total Dithiol |  |  | 1.50 | 100.0 |

E. Yield of tert-dodecyl-8-mercaptooctyl sulfide:
Pounds/pound of dithiol consumed...... 0.45
Mole percent based on ditiol used...... 44.5

F. Properties of the product composite:
Refractive index 20/D................. 1.4925
Specific gravity 20/4C................ 0.9158
Mole weight.......................... 339
Total sulfur, weight percent.......... 19.6
Mercaptan sulfur, weight percent..... 9.55
Color................................ Water White
Boiling temperature,[4] °F. at 760 mm. Hg.................................. 760
Mercaptan purity,[5] weight percent... 99+

[1] Total contact time: the reaction was complete in 2 hours as indicated by mercaptan surfur analyses.
[2] Was approximately half dithiol.
[3] Assumed to be the disulfide with mole weight of 514 [C$_{12}$H$_{15}$—S—(CH$_2$)$_8$—S—C$_{12}$H$_{25}$].
[4] Micro method.
[5] Calculated from mole weight and mercaptan sulfur.

Example VI

In order to accelerate the silver tarnish rate, a high concentration of hydrogen sulfide was produced in a closed glass desiccator by adding one ml. of a one weight percent solution of sodium hydrosulfide (NaHS) to one hundred ml. of water in the bottom of the desiccator. One ml. of a 1 weight percent NaHS solution liberated 3.2 ml. HS per 10,300 ml. of desiccator volume. Two freshly polished silver strips were prepared as follows: Moist Bon Ami was used to clean and polish the strips, then washed grit free with distilled water and dried with a soft cloth. One of the two silver strips was treated with a 10 weight percent solution of tert-dodecyl 8-mercaptooctyl sulfide in pure grade toluene and polished with a dry soft cloth to wipe away all but a thin protective film of the organic compound. The untreated and the treated silver strips were placed in the desiccator. The untreated polished strip tarnished in 10 minutes. The treated silver strip remained tarnish free for 3.5 hours. That is, the first appearance of tarnish occurred at 3.5 hours of exposure and the surface was yellow brown or fully tarnished at the end of 15 hours exposure. The organic compound provided a decreased tarnishing rate as compared to the untreated silver strip which was tarnished yellow brown over the surface in 15 minutes, whereas, the same degree of tarnish of the treated silver strip required 15 hours of the same exposure conditions.

Example VII

Compounds of the formula HS—R—S—R' were prepared wherein R equals 2 and R' equals C$_{20}$ and C$_{22}$–C$_{28}$, using the method of preparation as hereinbefore described. 1-Eicosene and a 1-olefin fraction predominantly C$_{22}$–C$_{28}$ were reacted with 2-mercaptoethanol using AIBN (azobisisobutyronitrile) as catalyst, then with thiourea and hydrochloric acid using the solvent and process steps as hereinbefore described. The yield and product purity for the two products are shown as follows:

|  | 2-mercaptoethyl-n-eicosyl sulfide | 2-mercaptoethyl n-C$_{22}$–C$_{28}$ sulfide |
|---|---|---|
| Mercaptan sulfur, wt. percent | 7.42 | 6.31 |
| Mercaptan purity, wt. percent[a] | 86.7 | 87.6 |
| Yield, mole percent[b] | 99.3 | 97.5 |

[a] Based on mercaptan sulfur and calculated molecular weight.
[b] Based on olefin charged.

Tests then were run utilizing the above-prepared compounds, together with a comparative run with the hereinbefore described 2-mercaptoethyl-n-octadecyl sulfide of my invention, as opposed to a comparative control run using an inhibitor of the prior art n-octadecyl mercaptan, under exposure conditions as described hereinbefore for Example VI.

Results of the tests were as follows:

| Run No. | Inhibitor | Protection |
|---|---|---|
| 1 | 2-mercaptoethyl-n-eicosyl sulfide | 12 hours. |
| 2 | 2-mercaptoethyl-n-C$_{22}$–C$_{28}$ sulfides | 16 hours. |
| 3 | 2-mercaptoethyl-n-octadecyl sulfide | 5 hours. |
| 4 | n-Octadecyl mercaptan | Less than 1 hour. |
| 5 | No inhibitor | Almost immediate black tarnish. |

These runs clearly show the high degree of protection obtained with compounds according to my invention.

Example VIII

Further tests were run, utilizing inhibitors according to the invention with the generic formula HS—R—S—R', wherein the compound was prepared using a C$_{30+}$ fraction of alpha-olefins, preparing the tarnished inhibitive compounds as per the methods described previously. The C$_{30+}$ fraction had the approximate composition:

Wt. percent
Paraffins ............................................. 9–12

Olefin Type Analysis
   Internal Olefins (cis and trans) ............... 6.2
   Alpha olefins ................................. 67.5
   Vinylidine .................................... 26.3

Average Carbon Number ........................... 32.5

Distribution, wt. percent
   C$_{28}$ and lighter ........................... 21.7
   C$_{30+}$ ..................................... 78.3

The C$_{30+}$ olefin fraction has an average carbon number by iodine number test of about 32.5. The product purity of the 2-mercaptoethyl-n-C$_{32.5}$ sulfide made from the C$_{30+}$ olefin fraction was estimated to be about 57.8 wt. percent, using an estimated average molecular weight of 549 and a determined mercaptan sulfur of 3.37 wt. percent.

Tests were run to determine the effectiveness of the 2-mercaptoethyl-$n$-$C_{30+}$ sulfide, along with comparative runs at the same time under the same conditions with 2-mercaptoethyl-$n$-octadecyl sulfide, 2-mercaptoethyl-$n$-eicosyl sulfide, 2-mercaptoethyl-$n$-$C_{22}$-$C_{28}$ sulfide, as well as with a control run without inhibitor, and a control run using $n$-octadecyl mercaptan, an inhibitor of the prior art.

Results of the tests showing number of hours to first trace of tarnish, average of several tests for each inhibitor, are as follows:

| Run No. | Inhibitor | Protection, hours |
|---|---|---|
| 1 | Octadecyl (MEOS) | 4.8. |
| 2 | Eicosyl | 7.3. |
| 3 | $C_{22}$-$C_{28}$ | 8.0. |
| 4 | $C_{30+}$ | 7.8. |
| 5 | None | Immediate tarnish. |
| 6 | Octadecyl mercaptan | Less than 1 hour. |

Example IX

A metal treating solution was prepared by dissolving 2.0 grams sodium sulfite in 96 grams of water and then adding 2.0 grams bis-(mercaptoethyl) ether. The mixture was stirred and became homogeneous. Tarnished copper strips were made free of tarnish by immersion in this solution.

Example X

One of the HS—R—O—R' compounds of the invention, 2-mercaptoethyl-$n$-octadecylether, has been found to be a surprisingly good tarnish inhibitor for copper as well as for silver. Evaluation has been carried out by polishing copper strips with Bon Ami, washing and drying, and then coating the clean strips with 10 weight percent solution of mercaptan in toluene. These strips were then suspended in an atmosphere containing $H_2S$ produced from a 0.01 weight percent solution of sodium hydrosulfide in a desiccator. After the test strip had been exposed to the $H_2S$ atmosphere for 48 hours, a light tarnish, or dull copper color, appeared.

Test strips coated with other known tarnishing agents became discolored and tarnished after about 6 hours of exposure to $H_2S$.

Reasonable variations and modifications of this invention can be made, or followed, in view of the foregoing disclosure, without departing from the spirit or scope thereof.

I claim:

1. A silver and copper tarnish preventive and polishing composition comprising:
   (a) at least one compound of the formula

HS—R—S—R' wherein R is an alkylene group and R' is selected from alkyl, cycloaliphatic and alkaryl groups with the further proviso that the compound can have up to and including 35 carbon atoms, said compound being present in an amount from 1 to 50 percent by weight;
   (b) an abrasive present in an amount from 5 to 98 percent by weight;
   (c) a diluent present in an amount from 1 to 90 percent by weight;
   (d) an odorizer present in an amount from 0 to 5 percent by weight; and
   (e) a suspending agent in an amount from 0 to 1 percent by weight.

2. The composition of claim 1 wherein said compound is 2-mercaptoethyl-$n$-octadecyl sulfide, tert-dodecyl 8-mercaptooctyl sulfide, 2-mercapto-$n$-eicosyl sulfide, one or more 2-mercaptoethyl-$n$-$C_{22}$–$C_{28}$ sulfides, or 2-mercaptoethyl-$n$-$C_{30+}$ sulfide.

3. A tarnish preventive composition for silver and copper surfaces comprising:
   (a) from about 1 to about 50 percent by weight of at least one compound of the formula R'—S—R—SH wherein R' is selected from alkyl, cycloaliphatic and alkaryl groups and R is an alkylene group, with the further proviso that the compound can have up to and including 35 carbon atoms,
   (b) from about 5 to about 98 percent by weight of an abrasive, and
   (c) the balance a diluent.

4. A method for the removal of tarnish from silver and copper metal surfaces which comprises bringing said tarnished metal surfaces into contact with an effective amount of a composition according to claim 3.

5. The method of claim 4 wherein the compound in said composition is 2-mercaptoethyl-$n$-octadecyl sulfide, tert-dodecyl 8-mercaptooctyl sulfide, 2-mercapto-$n$-eicosyl sulfide, one or more 2-mercaptoethyl-$n$-$C_{22}$–$C_{28}$ sulfides, or 2-mercaptoethyl-$n$-$C_{30+}$ sulfide.

6. An article of manufacture comprising a silver or copper surface having thereon a film of a compound having the formula HS—R—S—R' wherein R is an alkylene group and R' is selected from alkyl, cycloaliphatic, and alkaryl groups, with the further proviso that the compound can have up to and including 35 carbon atoms, which protects the silver and copper surface from tarnish.

7. An article of manufacture as described in claim 6 wherein the compound is 2-mercaptoethyl-$n$-octadecyl sulfide, tert-dodecyl 8-mercaptooctyl sulfide, 2-mercapto-$n$-eicosyl sulfide, one or more 2-mercaptoethyl-$n$-$C_{22}$–$C_{28}$ sulfides, or 2-mercaptoethyl-$n$-$C_{30+}$ sulfide.

8. A silver and copper tarnish preventive and polishing composition consisting essentially of:
   (a) 1 to 50 percent by weight of a compound of the formula

HS—R—S—R' wherein R is an alkylene group having 1 to 10 carbon atoms and R' is selected from alkyl, cycloaliphatic and alkaryl groups having 5 to 25 carbon atoms;
   (b) an abrasive present in an amount from 5 to 98 percent by weight;
   (c) a diluent present in an amount from 1 to 90 percent by weight;
   (d) an odorizer present in an amount from 0 to 5 percent by weight; and
   (e) a suspending agent in an amount from 0 to 1 percent by weight.

9. A tarnish preventive composition comprising 1 to 50 weight percent of a compound selected from 2-mercaptoethyl-$n$-octadecyl sulfide, tert-dodecyl 2-mercaptooctyl sulfide, and 2-mercaptoethyl-$n$-eicosyl sulfide, about 5 to about 98 weight percent of an abrasive and about 1 to about 90 weight percent of a diluent.

10. A tarnish preventive composition for silver and copper surfaces comprising
    (a) from about 1 to about 50 percent by weight of at least one compound of the formula

R'—S—R—SH wherein R' is selected from alkyl, cycloaliphatic and alkaryl groups having 5 to 25 carbon atoms, and R is a hydrocarbon group having 1 to 10 carbon atoms,
    (b) from about 5 to about 98 percent by weight of an abrasive, and
    (c) the balance a diluent.

11. A composition according to claim 10 wherein said compound is 2-mercaptoethyl $n$-octadecyl sulfide, 2-mercaptoethyl-$n$-eicosyl sulfide, or tert-dodecyl 8-mercaptooctyl sulfide.

12. A method for the removal of tarnish on a silver or copper surface which comprises applying to said surface a tarnish-inhibiting amount of a composition according to claim 10.

13. A tarnish preventing composition for silver and copper surfaces comprising (a) from about 1 to about 50 percent by weight of at least one compound of the formula

HS—R"—S—R"—SH wherein R" is an alkylene group having 6 to 12 carbon atoms, (b) from about 5 to about 98 percent by weight of an abrasive, and (c) the balance a diluent.

14. A method for the removal of tarnish from a metal surface which comprises applying to said surface a tarnish-inhibiting amount of a composition according to claim 13.

15. A silver and copper tarnish preventive and polishing composition comprising:

(a) at least one compound of the formula

HS—R—S—R' or HS—R"—S—R"—SH wherein R is an alkylene group having 1 to 10 carbon atoms, R' is selected from alkyl, cycloaliphatic and alkaryl groups having from 5 to 25 carbon atoms and R" is an alkylene group having from 6 to 12 carbon atoms, said compound being present in an amount from 1 to 50 percent by weight;

(b) an abrasive present in an amount from 5 to 98 percent by weight;

(c) a diluent present in an amount from 1 to 90 percent by weight;

(d) an odorizer present in an amount from 0 to 5 percent by weight; and (e) a suspending agent in an amount from 0 to 1 percent by weight.

16. A composition according to claim 13 wherein said compound is bis-(1-mercaptooctyl) sulfide.

17. A silver and copper tarnish preventive and polishing composition comprising:

(a) 1 to 50 weight percent of 2-mercaptoethyl-$n$-octadecyl sulfide, (b) an abrasive present in an amount from 5 to 98 percent by weight, (c) a diluent present in an amount from 1 to 90 percent by weight, (d) an odorizer present in an amount from 0 to 5 percent by weight, and (e) a suspending agent in an amount from 0 to 1 percent by weight.

18. A silver and copper tarnish preventive and polishing composition comprising:

(a) 1 to 50 weight percent of bis-(1-mercaptooctyl) sulfide, (b) an abrasive present in an amount from 5 to 98 percent by weight, (c) a diluent present in an amount from 1 to 90 percent by weight, (d) an odorizer present in an amount from 0 to 5 percent by weight, and (e) a suspending agent in an amount from 0 to 1 percent by weight.

19. A silver and copper tarnish preventive and polishing composition comprising:

(a) 1 to 50 weight percent of tert-dodecyl 8-mercaptooctyl sulfide, (b) an abrasive present in an amount from 5 to 98 percent by weight, (c) a diluent present in an amount from 1 to 90 percent by weight, (d) an odorizer present in an amount from 0 to 5 percent by weight, and (e) a suspending agent in an amount from 0 to 1 percent by weight.

20. An article of manufacture comprising a silver or copper surface having thereon a film of a compound having the formula HS—R—S—R' or HS—R"—S—R"—SH wherein R is an alkylene group having 1 to 10 carbon atoms, R' is selected from alkyl, cycloaliphatic and alkaryl groups having from 5 to 25 carbon atoms and R" is an alkylene group having from 6 to 12 carbon atoms, which protects the silver and copper surface from tarnish.

21. An article of manufacture as described in claim 20 wherein the compound is 2-mercaptoethyl-$n$-octadecyl sulfide, tert-dodecyl 8-mercaptooctyl sulfide, 2-mercaptoethyl-$n$-eicosyl sulfide, or bis-(1-mercaptooctyl)sulfide.

References Cited

UNITED STATES PATENTS

| | | | |
|---|---|---|---|
| 2,230,966 | 4/1941 | Reid et al. | 260—609 |
| 2,490,984 | 12/1949 | Synder | 260—609 |
| 2,691,593 | 10/1954 | Avedikian | 106—10 X |
| 2,841,501 | 7/1958 | Murphy | 106—3 |
| 3,117,012 | 1/1964 | Aler et al. | 106—3 X |
| 3,219,638 | 11/1965 | Warner | 260—70 X |
| 3,345,295 | 10/1967 | Schwarcz et al. | 106—3 X |
| 3,365,312 | 1/1968 | Nowack | 106—3 |
| 3,398,003 | 8/1968 | Smith et al. | 106—3 |
| 3,522,314 | 7/1970 | Warner | 106—3 X |
| 3,607,318 | 9/1971 | Warner | 106—3 |

FOREIGN PATENTS

| | | | |
|---|---|---|---|
| 508,855 | 1/1955 | Canada | 106—3 |
| 737,427 | 8/1969 | Belgium | 106—3 |

OTHER REFERENCES

J. Am. Chem. Soc., vol. 88, 1966, pp. 1828–30, QDIAS. Ibid, vol. 69, 1947, pp. 2675–77.

JOSEPH L. SCHOFER, Primary Examiner

H. J. LILLING, Assistant Examiner

U.S. Cl. X.R.

51—307; 260—609 R, 609 D, 609 E